United States Patent [19]
Bathurst et al.

[11] Patent Number: 5,792,347
[45] Date of Patent: Aug. 11, 1998

[54] EFFLUENT PRECIPITATION AND NEUTRALIZATION VESSEL AND METHOD

[75] Inventors: Gordon Bathurst, Pointe Claire; John Riviere, Beaconsfield, both of Canada

[73] Assignee: Metafix Inc., Canada

[21] Appl. No.: 843,643

[22] Filed: Apr. 10, 1997

[51] Int. Cl.⁶ .................................................. B01D 21/00
[52] U.S. Cl. .......................... 210/202; 210/207; 210/232; 210/244; 210/248; 210/350; 210/451; 210/484; 266/170
[58] Field of Search ................................. 210/198.1, 202, 210/205, 207, 232, 244, 248, 350–352, 451, 484; 266/170

[56] References Cited

U.S. PATENT DOCUMENTS

| | | | |
|---|---|---|---|
| 2,593,228 | 4/1952 | Wagner | 210/134 |
| 4,039,452 | 8/1977 | Fernandez | 210/106 |
| 4,608,177 | 8/1986 | Wood | 210/738 |
| 5,084,168 | 1/1992 | Woog | 210/202 |
| 5,112,479 | 5/1992 | Srimongkolkul | 210/149 |
| 5,132,002 | 7/1992 | Woog | 210/719 |
| 5,229,009 | 7/1993 | Woog | 210/719 |
| 5,298,170 | 3/1994 | Woog | 210/719 |
| 5,317,360 | 5/1994 | Woog | 354/324 |
| 5,470,470 | 11/1995 | Leyat | 210/350 |
| 5,688,401 | 11/1997 | Bober et al. | 210/199 |

*Primary Examiner*—Peter A. Hruskoci
*Attorney, Agent, or Firm*—Bachman & LaPointe, P.C.

[57] ABSTRACT

A neutral dischargeable effluent is developed by reaction between an acidic, spent photographic fixer liquid and an alkaline, spent photographic developer liquid; the spent fixer liquid contains iron in solution, the iron being introduced in a de-silvering pretreatment of the spent fixer liquid. The two liquids are fed into a treatment chamber and are allowed to react in the treatment chamber to form a neutral liquid and precipitated iron-containing solids; the solids settle in the treatment chamber and the neutral liquid rises upwardly through a synthetic organic polymer fiber filter pad into a discharge chamber above the filter pad; fine sticky particles suspended in the rising neutral liquid are retained by the filter pad; a neutral effluent is discharged from the discharge chamber.

15 Claims, 2 Drawing Sheets

EFFLUENT PRECIPITATION AND NEUTRALIZATION VESSEL AND METHOD

BACKGROUND OF THE INVENTION a) Field of the Invention

This invention relates to an apparatus and method for treating spent photographic fixer and developer liquids, with generation of a neutral effluent.

b) Description of Prior Art

Photographic development sites generate an acidic spent photographic fixer liquid which is treated to remove silver, and an alkaline spent photographic developer liquid.

The spent photographic fixer liquid typically contains iron oxides in solution, the iron having been introduced into the spent fixer liquid in exchange for the silver, in the treatment of the spent fixer liquid to remove silver.

If the spent liquids are discharged through the same drain, iron-containing solids precipitate as the liquids react, and the solids may clog or block the drain. It is often inconvenient to discharge the two spent liquids through separate drains.

U.S. Pat. Nos. 4,608,177; 5,132,022; 5,229,009 and 5,298,170 of G. Woog describe cylindrical devices for treating the two liquids together to form a neutral effluent, in conjunction with de-silvering of the spent fixer liquid. U.S. Pat. No. 5,084,168 of M. Woog describes cylindrical devices for precipitating solids from spent liquids and filtering the solids from the liquid.

These prior cylindrical devices are relatively complicated structures with numerous component parts. There remains a need to further improve on the problem of disposal of these spent photographic liquids.

SUMMARY OF THE INVENTION

It is an object of this invention to provide a precipitation and neutralization vessel for treating spent photographic fixer and developer liquids.

It is a specific object to provide such a vessel which can be disposed after use, and appropriate treatment, in landfill sites which do not permit disposal of liquid-containing devices.

It is another object of this invention to provide a method of generating a neutral, dischargeable effluent from spent photographic fixer and developer liquids.

In accordance with one aspect of the invention there is provided a precipitation and neutralization vessel for treating spent photographic fixer and developer liquids, comprising: i) a housing having a floor, a wall extending upwardly from said floor and an open top, ii) a cover for removably covering the housing open top, iii) an upper chamber and a lower chamber defined within said housing, iv) a compressible filter pad separating said upper and lower chambers, said pad being of synthetic organic polymer fibers, said pad being held under compression, v) inlet means in said wall in communication with said lower chamber, for introducing spent photographic fixer and developer liquids directly into said lower chamber, vi) outlet means in said wall in communication with said upper chamber, for discharge from said housing, of liquid in said upper chamber, vii) water inlet means in said wall, said water inlet means having an outlet port in communication with said outlet means.

In another aspect of the invention there is provided a method of generating a neutral, dischargeable effluent from an acidic, de-silvered spent photographic fixer liquid and an alkaline spent photographic developer liquid comprising: i) providing a housing having an upper chamber and a lower chamber separated by a filter assembly comprising a compressible filter pad of synthetic organic polymer fibers, said pad being held under compression, ii) feeding acidic de-silvered spent photographic fixer liquid containing dissolved iron, and alkaline spent photographic developer liquid, as discrete and separate streams into said lower chamber, iii) allowing said spent acidic and alkaline liquids to react in said lower chamber to precipitate iron-containing solids; iv) allowing said iron-containing solids to settle in said lower chamber with development of neutral liquid containing suspended particles, above the settling solids; v) allowing said neutral liquid to flow upwardly from said lower chamber through said filter assembly and into said upper chamber, while retaining a sticky particle fraction of said suspended solids, by filtration, in said filter pad, to form a neutral liquid in said upper chamber; vi) discharging a mixture of water and neutral liquid from said upper chamber through a discharge outlet and out of said housing, and vii) feeding water into said discharge outlet.

DESCRIPTION OF PREFERRED EMBODIMENTS

The invention is particularly concerned with a vessel and method in which a spent and de-silvered photographic fixer liquid which contains iron in solution and which is acidic; and a spent photographic developer liquid which is alkaline are reacted together to produce a neutral liquid, precipitated iron-containing solids are removed by settling and a sticky particle fraction of suspended solids is removed by filtering.

The spent and de-silvered photographic fixer liquid typically has a pH of 4 to 5 and contains iron in solution which has replaced the silver content of the spent fixer liquid in a pretreatment for silver recovery in which iron in steel wool or a similar iron-containing substrate, is sacrificed in favour of silver. The iron enters into solution in the spent fixer liquid and the silver is precipitated from solution and recovered.

The spent photographic developer liquid typically has a pH of 10 to 11.

The spent fixer liquid and the spent developer liquid are delivered to the treatment chamber, which is the lower chamber of the vessel, below the filter pad, as separate and discrete streams which do not contact each other prior to entry into the treatment chamber.

Suitably the two liquids are fed continuously into the treatment chamber at flow rates to provide balanced amounts of the acidic spent fixer liquid and the alkaline spent developer liquid, to achieve neutralization, however, it is also possible to add additional acidic material to the acidic stream, or additional alkaline material to the alkaline stream, in order to achieve the required balance for neutralization.

In the treatment chamber the acidic and alkaline components react to form a neutral liquid and the pH adjustment causes precipitation of iron-containing solids; larger, non-suspendible, iron-containing particles settle under gravity, towards a collecting zone above the floor of the vessel as neutral liquid in a zone above the collecting zone, containing fine, suspended particles rises upwardly. The suspended particles originate from the dissolved chemical in the spent liquids and include a fraction of particles which are sticky in nature.

An inert substrate for collecting the settling solids is suitably supported in the collecting zone in a lower portion of the treatment chamber. Conveniently, this substrate provides a large surface area on which the settling solids are collected.

One suitable substrate is an expanded plastic mesh, which provides a myriad of passages between overlying strands or strips of the plastic mesh, through which the settling solids may descend and collect on the strands or strips of the mesh at different levels of the mesh.

The neutral liquid developed in the treatment chamber rises upwardly through the filter pad into the discharge chamber, which is the upper chamber, being displaced by incoming spent liquids.

The filter pad, in a compressed state, is pervious to the rising neutral liquid and non-sticky particles, but impervious to the fine particle, suspended sticky solids in the rising liquid, and the suspended sticky solids are trapped and retained within the filter pad.

The removal of the sticky particles by the filter pad prevents the sticky particles entering the discharge outlet where they would adhere together and to surfaces of the discharge outlet or conduits downstream of the discharge outlet, thereby collecting and choking the discharge outlet or associated conduits and interfering with efficient discharge of effluent from the discharge chamber.

An especially suitable filter pad is a pad of polyester fibers, in which the fibers have a length of 7.5 to 13 cm; the pad having a weight of 150 to 165 g/m$^2$ and an uncompressed thickness of 12.5 to 20.5 mm.

One such polyester fiber pad is composed of hollow fibers, thermally bonded together, the fibers having a denier of 3 to 25, preferably 12 to 20, more preferably about 15.

The filter pad is suitably compressed, in use, to a thickness of 6 mm to 10 mm. The filter pad may be composed of a stack of discrete pads to improve the filtration.

One such fiber pad is a quilt material available under the Trade Mark JASZ TEX from Jasztex Fibres, Inc., of St. Leonard, Quebec.

Neutral liquid collects in the discharge chamber and is diluted by water entering the discharge compartment from an inflow conduit.

The clarified liquid is further diluted with water during discharge from the discharge chamber, with water delivered directly from the inflow conduit to a receiving port of a discharge outlet from the discharge chamber.

Thus water is fed into the vessel by the in-flow conduit, a portion of the water of the order of 5 to 10% is discharged into the upper or discharge chamber to dilute the liquid in the discharge chamber and the remainder of the water flows directly from the in-flow conduit into the discharge outlet to both flush the discharge outlet and further dilute the clarified neutral liquid during discharge from the vessel.

The water flowing directly into the discharge outlet flushes away the non-sticky particles which might otherwise collect in the outlet. Since the sticky particles have been removed from the effluent by the filter pad they do not have an opportunity to clog the discharge outlet.

In order to achieve this division of the water being fed into the vessel the water inlet and the discharge outlet are in generally opposed relationship and located on opposite sides of the vessel. The in-flow conduit of the water inlet extends across the discharge chamber and terminates in an outlet port for discharge of the water flowing along the in-flow conduit.

The outlet port has an end wall or face circumscribing a discharge orifice.

The discharge outlet has an inner receiving port and an outer discharge port, with a flow passage communicating the receiving port and the discharge port. The receiving port has an end wall or face circumscribing a receiving orifice.

The end wall of the outlet port is inclined such that a lower portion of this end wall extends within, and is disposed within the inner receiving port, and is spaced inwardly of the end wall of the receiving port, while an upper portion of the end wall of the outlet port is disposed within the discharge chamber and is spaced outwardly of the end wall of the receiving port. In this way water flowing through the in-flow conduit has direct access to the discharge chamber at the upper portion of the outlet port end wall, and direct access to the discharge outlet at the lower portion of the outlet port end wall.

In operation, introduction of the spent liquids into the treatment chamber and introduction of water into the discharge chamber and the discharge outlet is suitably carried out on a continuous basis.

In a vessel having a discharge chamber with a volume of about 7,300 cm$^3$ and a treatment chamber with a volume of about 10,800 cm$^3$, the acidic, spent fixer liquid and the alkaline spent developer liquid are suitably fed into the treatment chamber at a flow rate of 90 cc/min to 450 cc/min; and water is fed through the in-flow conduit at a flow rate of 1000 cc/min to 8000 cc/min flowing directly into the discharge chamber and 90 to 95% flowing directly into the discharge outlet. Neutralized, clarified liquid is discharged from the vessel at 90 cc/min to 450 cc/min.

The discharged liquid can be fed directly into a sewage system.

When the vessel has exhausted its ability to efficiently generate a neutral, clarified liquid as a result of accumulation of precipitated solids in the treatment chamber or exhaustion of the filtering capacity of the filter pad as a result of clogging of the porous structure of the pad with sticky particles, the feeding of the spent liquids and water into the vessel is discontinued. The vessel is placed on its side and an opening is formed, for example, by drilling into the upwardly facing wall of the treatment chamber, a solidifying or gelling agent is added through this opening which agent is effective to solidify the liquid content. One suitable solidifying agent is that available under the Trade Mark Neo Solution from Neo-Solutions Inc., and which is employed in disposable diapers. After addition of the agent, the opening is closed with a plug and the vessel is shaken to disperse the agent and allow the liquid content to solidify.

The resulting vessel can then be disposed of in a landfill.

In this Specification reference to a "neutral" liquid or effluent refers to a liquid or effluent having a pH of about 7.

DESCRIPTION OF PREFERRED EMBODIMENTS WITH REFERENCE TO THE DRAWINGS

Figure 1:
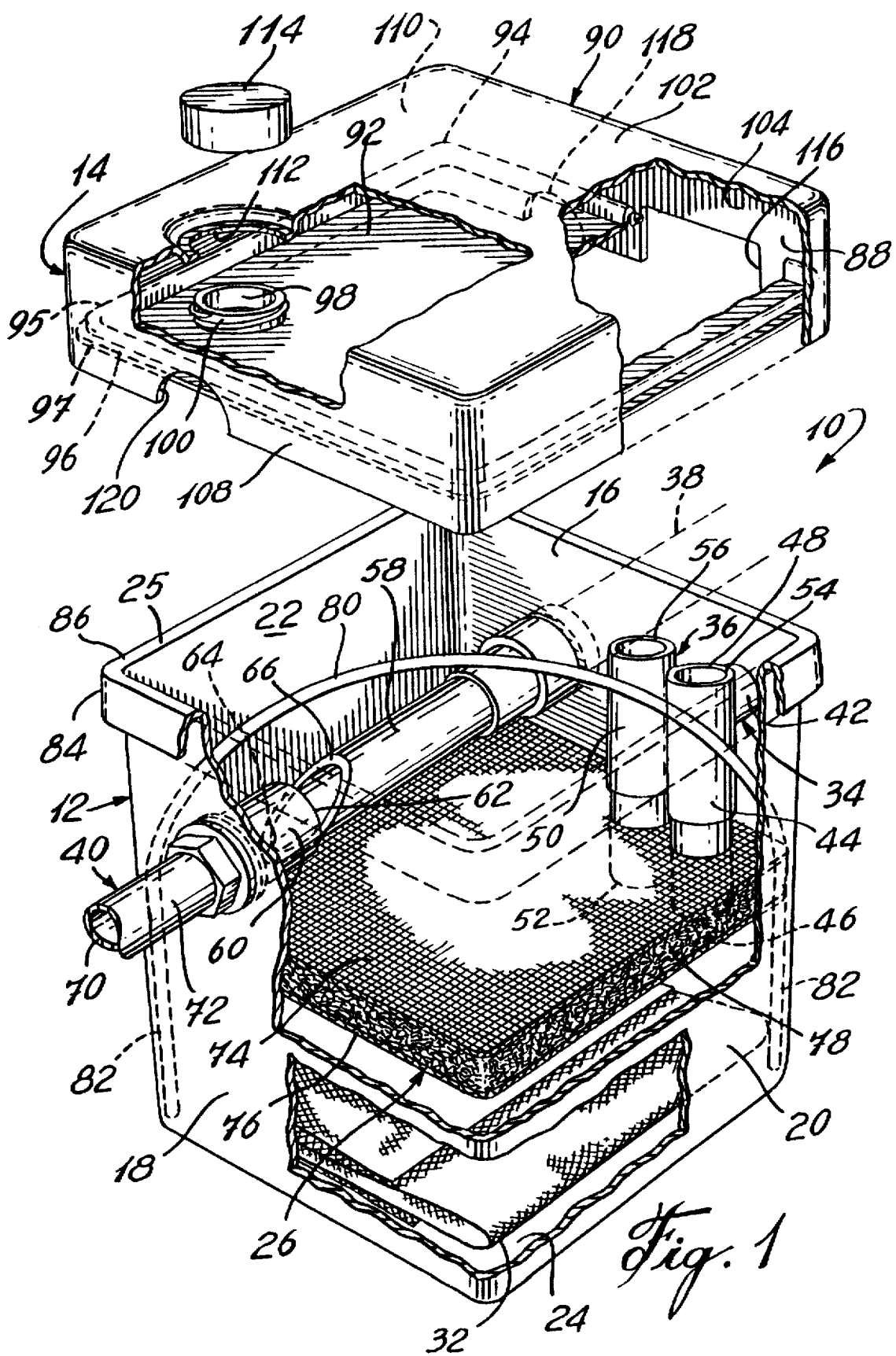
FIG. 1 is a perspective view of a vessel of the invention with the cover removed.
Figure 2:
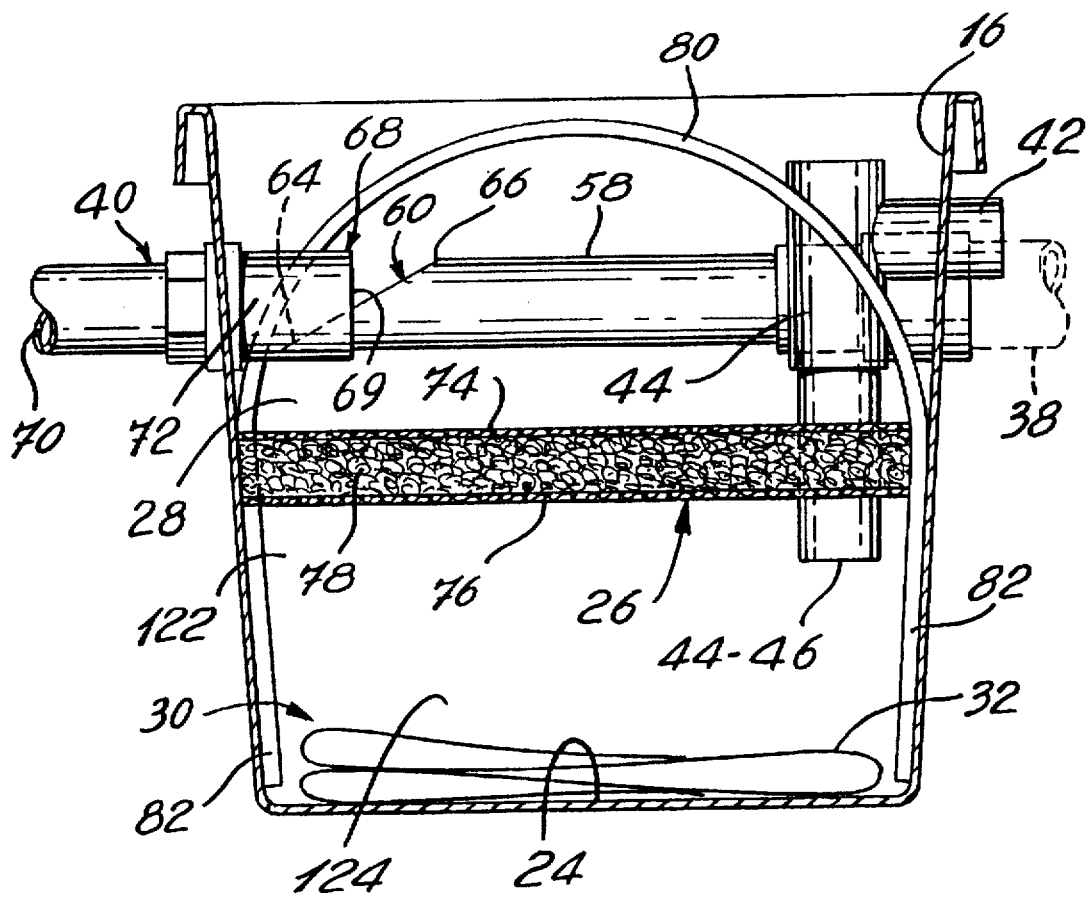
FIG. 2 is a side view of the vessel of FIG. 1 with one wall removed to better show the interior.

With further reference to FIGS. 1 and 2, a vessel 10 has a rectangular bucket 12 and a cover assembly 14.

Bucket 12 has side walls 16, 18, 20 and 22 which diverge upwardly outwardly from a floor 24 to an open top 25.

A filter assembly 26 mounted in bucket 12 between walls 16, 18, 20 and 22 separates an upper discharge chamber from a lower treatment chamber.

Treatment chamber 30 houses a plastic mesh 32 which may be bundled, folded or otherwise supported on floor 24.

A delivery conduit 34 for in-flow of spent fixer liquid into vessel 10, is mounted in wall 16, as is a similar delivery conduit 36 for spent developer liquid.

A water inlet 38 is likewise mounted in wall 16.

A discharge outlet 40 is mounted in wall 18 so as to be in generally opposed relationship with water inlet 38.

Delivery conduit 34 for spent fixer liquid includes a horizontal conduit 42 extending into discharge chamber 28 and a vertical conduit 44 extending through filter assembly 26 to an outlet 46 in treatment chamber 30.

Delivery conduit 36 for spent developer liquid, similarly includes a horizontal conduit 48 in discharge chamber 28 and a vertical conduit 50 which extends through filter assembly 26 to an outlet 52 in treatment chamber 30.

Vertical conduits 44 and 50 include portions extending vertically above the horizontal conduits 42 and 48 to define overflows 54 and 56, respectively.

Water inlet 38 includes an elongate inflow conduit 58 extending across discharge chamber 28 and terminating in a discharge port 60.

Discharge port 60 has an inclined annular face 62 having a lower end 64 and an upper end 66.

Discharge outlet 40 includes a receiving port 68 in opposed relationship with said discharge port 60. Receiving port 68 communicates with a discharge port 70 via a flow passage 72.

The lower end 64 of discharge port 60 extends into the discharge outlet 40 and more particularly lower end 64 is spaced inwardly of an outer annular face 69 of receiving port 68, whereas upper end 66 of discharge port 60 is spaced outwardly of face 69 of receiving port 68.

A filter assembly 26 includes an upper screen 74, a lower screen 76 and a filter pad 78 therebetween.

An elongate resilient bracing rod 80 extends between opposite corners of upper screen 74 and on mounting of cover assembly 14 is braced so that upper screen 74 is urged downwardly to compress filter pad 78. A similar bracing rod (not shown) may be disposed between the other two corners of upper screen 74.

Corner bracing rods 82 extend between floor 24 and lower screen 76 and in conjunction with the bracing rod 80 hold the filter assembly 26 in a generally planar configuration with the filer pad 78 in a compressed state.

Bucket 12 has a peripheral rim 84 spaced outwardly of walls 16, 18, 20 and 22, at open top 25, said rim 84 having an upper edge 86.

Cover assembly 14 includes an inner cover 88 and an outer cover 90.

Inner cover 88 includes a panel 92 with an outer upstanding peripheral wall 94 having a rim 95 extending downwardly from its upper end to define a peripheral groove or channel 96; a lip 97 extends outwardly from a lower end of rim 95. On assembly the upper ends of walls 16, 18, 20 and 22 are seated in groove 96 and lip 97 is seated on upper edge 86 at its outer lower end in a lip 96.

A viewing port 98 is defined in panel 92, the viewing port 98 being circumscribed by a threaded annular spigot 100.

Outer cover 90 includes a roof 102 from which extends downwardly walls 104, 106, 108 and 110. A viewing port 112 in roof 102 is aligned with viewing port 98 in inner cover 88, and is configured so as to receive the spigot 100. A cap 114 engages the threaded annular spigot 100 to lock outer cover 90 to inner cover 88.

Cutouts 116 and 118 are formed in wall 104 and cutout 120 is formed in wall 108 so that the external portions of delivery conduits 34 and 36, water inlet 38 and discharge outlet 40 do not obstruct closure of open top 25 by cover assembly 14.

Treatment chamber 30 generally includes a collecting zone 124 within which is housed the plastic mesh 32, and a suspended solids zone 122 between collecting zone 124 and filter assembly 26.

In operation cover assembly 12 is applied to bucket 12 so that flange rim 96 of inner cover 88 rests on rim 84 and walls 104, 106, 108 and 110 extend in frictional engagement with rim wall 86.

Spent fixer liquid enters the vessel 10 through horizontal conduit 42 and flows along vertical conduit 44 exiting from outlet 46 into treatment chamber 30. Spent developer liquid enters vessel 10 through horizontal conduit 48 and flows downwardly along vertical conduit 50 exiting from outlet 52 into treatment chamber 30. The flow rates are adjusted so that the acidic spent fixer liquid will react with the alkaline spent developer liquid to form a neutralized or neutral liquid. In this reaction iron dissolved in the spent fixer liquid is precipitated as iron-containing solids which solids settle under gravity and collect in and on the plastic mesh 32 in collecting zone 124. The settling of the solids leaves a liquid with fine suspended particles in suspended solids zone 122 above the collecting zone 124 and which generally extends above outlets 46 and 52 to lower screen 76. With the continued flow of spent fixer liquid and spent developer liquid into treatment chamber 30 the neutral liquid containing fine suspended particles which do not settle rises upwardly through filter assembly 26 to discharge chamber 28, the sticky fraction of the suspended particles being retained within pad 78.

As the process proceeds, the level of clarified neutral liquid in discharge chamber 28 rises until it is able to flow from discharge chamber 28 through discharge outlet 40 in wall 18.

Throughout this process, water is introduced into the vessel 10 through water inlet 38. This water flows along the in-flow conduit 58 to discharge port 60. A small portion of this water flows from discharge outlet 60 into discharge chamber 28 at the upper end 66 of inclined annular face 62. The remainder of the water flows directly from discharge port 60 into the receiving port 68 of discharge outlet 40, in the region of lower end 64.

The water flowing directly from in-flow conduit 58 to discharge outlet 40 serves to flush receiving port 68, flow passage 72 and discharge port 70 of residual solids entrained in the neutral liquid and which might otherwise accumulate on the interior walls of the discharge outlet 40.

Water entering discharge chamber 28 from discharge port 60 serves to dilute the neutral liquid, and to maintain the volume of liquid in discharge chamber 28 such that the upper level of liquid is sufficiently high for flow of liquid from discharge chamber 28 through discharge outlet 40.

The flow of liquids and the water and the discharge of the neutral liquid from the vessel proceed on a continuous basis and the state of the discharge liquid can be viewed from time to time by removing cap 114 whereby the interior may be viewed through the aligned viewing ports 98 and 112.

When the accumulation of precipitated solids in treatment chamber 30 and/or saturation of the filter pad 78 with retained sticky particles is such that the neutralizing and clarifying process does not proceed efficiently, the flow of the liquid and water into the vessel 10 and the discharge of effluent from the vessel 10 is interrupted. At this stage the vessel 10 still has a liquid content even though it may contain considerable accumulated solids.

The vessel 10 is disconnected from the sources of the spent liquids and water; liquid remaining in the upper chamber 28 is poured from the vessel through the discharge outlet 40, by appropriately tilting vessel 10. The vessel 10 is placed on one side, for example, with side wall 20 uppermost, and an opening is formed in side wall 20, into treatment chamber 30. A solidifying or gelling agent is introduced into chamber 30 through the opening, the opening is plugged and the vessel 10 is agitated to disperse the agent in chamber 30. This solidifies the liquid content of the vessel and the vessel can then be disposed off as solid waste in a landfill.

The bucket 12 and cover assembly 14 of vessel 10 as well as the delivery conduits 34 and 36, the water inlet 38 and the discharge outlet 40 are all readily fabricated from inexpensive plastic materials so that the vessel 10 is of low cost which facilitates its disposal or discard after use.

Of course, it remains possible to disassemble and clean the vessel for reuse, potentially with a fresh plastic mesh 32 and filter pad 78, but with the low cost of the components of vessel 10, it will generally be more cost effective to introduce the solidifying or gelling agent and discard the vessel as solid waste in a landfill.

A vessel 10 having a treatment chamber 30 with a volume of about 10,800 cm$^3$ and a discharge chamber 28 with a volume of about 7,300 cm$^3$, employing a filter pad 78 of thermally bonded polyester fibers, the fibers being 7.5 to 13 cm in length, the pad having a weight of 150 to 165 g/m$^2$, and an uncompressed thickness of 12.5 to 20.5 mm, the fibers being hollow and having a denier of about 15 has a useful life corresponding to treatment of about 3,785 liters of acidic, spent, de-silvered photographic fixer liquid and 3,785 liters of alkaline, spent, photographic developer liquid.

The generally flat side walls 16 and 18 of the bucket 12 facilitate the sealed mounting of the delivery conduits 34 and 36, the water inlet 38 and the discharge outlet 40, as compared with cylindrical devices such as in the prior art mentioned hereinbefore.

The interior walls of the discharge outlet 40 more especially receiving port 68, discharge port 70 and flow passage 72 are suitably coated with a non-stick coating such as the polytetrafluoroethylene products available under the Trade Mark TEFLON. This coating inhibits adhesion of solid particles entrained by the discharge liquid, to the interior walls which might ultimately result in clogging of the discharge outlet 40.

Viewing port 98 also provides ready access for sampling the quality or character of the effluent so that any necessary adjustment can be made in the relative flows of the spent liquids and water into the vessel 10 to alter the quality or character of the effluent in response to the sampling.

We Claim:

1. A precipitation and neutralization vessel for treating spent photographic fixer and developer liquid, comprising:

i) a housing having a floor, a wall extending upwardly from said floor, and an open top, ii) a cover for removably covering the housing open top, iii) an upper chamber and a lower chamber defined within said housing, iv) a compressible filter pad separating said upper and lower chambers, said pad being of synthetic organic polymer fibers, said pad being held under compression, v) inlet means in said wall in communication with said lower chamber, for introducing spent photographic fixer and developer liquids directly into said lower chamber, said inlet means being arranged to allow for formation of a neutral liquid and precipitated settled solids in said lower chamber, vi) outlet means in said wall in communication with said upper chamber, for discharge from said housing, of liquid in said upper chamber, said outlet means being arranged to receive filtered neutral liquid flowing from said lower chamber through said filter pad and into said upper chamber.

vii) water inlet means in said wall, said water inlet means having an outlet port in communication with said outlet means.

2. A vessel according to claim 1, further including first and second support screen members, said filter pad being compressed between said support screen members.

3. A vessel according to claim 2, wherein said pad is of polyester fibers, said fibers being thermally bonded together.

4. A vessel according to claim 3, wherein said fibers have a length of 7.5 to 13 cm; said paid having a weight of 150 to 165 g/m$^2$, and an uncompressed thickness of 1.25 to 2.05 cm, and a compressed thickness of 6 to 10 mm.

5. A vessel according to claim 4, wherein said fibers are hollow fibers of 13 to 25 denier.

6. A vessel according to claim 5, wherein said outlet means has an outer discharge port, a flow passage communicating said inner receiving port and said outer discharge port, said flow passage having an interior wall against which liquid discharged from said vessel flows, at least part of said interior wall having a coating of polytetrafluoroethylene.

7. A vessel according to claim 2, wherein said first support screen is above said pad, and further including first resilient bracing members bracingly extended between said first support screen and said cover to urge said first support screen downwardly in compressing engagement with said paid.

8. A vessel according to claim 7, further including second resilient bracing members bracingly extended between said second support screen and said floor to urge said second support screen upwardly in compressing engagement with said pad.

9. A vessel according to claim 1, wherein said water inlet means comprises an in-flow conduit extending across said upper chamber and terminating in said outlet port for discharge of water flowing along said in-flow conduit, said outlet port having a first end wall circumscribing a discharge orifice, said outlet means comprising an inner receiving port in flow communication with said upper chamber, said receiving port having a second end wall circumscribing a receiving orifice, a lower portion of said first end wall being disposed within said inner receiving port and spaced inwardly of said second end wall, and an upper portion of said first end wall being disposed within said upper chamber and spaced outwardly of said second end wall.

10. A vessel according to claim 9, of generally rectangular cross-section; said wall comprising four side walls diverging from said floor to said open top, said side walls providing flat surfaces for sealingly mounting said inlet means and said outlet means.

11. A vessel according to claim 10, wherein said inlet means comprises first and second discrete inlet conduits each having an upstream end extending through a said side wall into said upper chamber, and a downstream end extending through said pad and terminating in said lower chamber.

12. A vessel according to claim 1, wherein said outlet port also communicates with said upper chamber.

13. A precipitation and neutralization vessel for treating spent photographic fixer and developer liquids comprising:
   a) a generally rectangular housing having a floor and four side walls diverging from said floor to an open top,
   b) a cover for removably covering the housing open top,
   c) a filter assembly seated in said housing and spaced from said open top and said floor, said filter assembly comprising first and second support screen members and a compressible filter pad between said support screen members, said pad being of hollow polyester fibers of 12 to 20 denier thermally bonded together, said pad having an uncompressed thickness of 12.5 to 20.5 mm and a weight of 150 to 165 g/m$^2$,
   d) first resilient bracing members bracingly extended between said first support screen and said cover to urge said first support screen downwardly in compressing engagement with said pad, said first resilient bracing members urging said filter assembly downwardly against said side walls whereby said pad is held under compression in said filter assembly,
   e) an upper chamber defined in said housing between said filter assembly and said cover, and a lower chamber defined in said housing between said filter assembly and said floor,
   f) first and second discrete inlet conduits each having an upstream end extending through a said side wall into said upper chamber, and a downstream end extending through said filter assembly and terminating in said lower chamber, said first and second discrete inlet conduits introducing spent photographic fixer liquid and spent photographic developer liquid, respectively directly into said lower chamber, said inlet means being arranged to allow for formation of a neutral liquid and precipitated settled solids in said lower chamber,
   g) outlet means in a first side wall of said housing, in communication with said upper chamber, said outlet means being arranged to receive filtered neutral liquid flowing from said lower chamber through said filter assembly and into said upper chamber said outlet means having an inner receiving port in flow communication with said upper chamber, an outer discharge port and a flow passage communicating said inner receiving port and said outer discharge port, said inner receiving port having a receiving port end wall circumscribing a receiving orifice,
   h) water inlet means in a second side wall of said housing, said second side wall being in opposed relationship with said first side wall, said water inlet means comprising an inflow conduit extending across said upper chamber and terminating in an outlet port in communication with said upper chamber for discharge of water flowing along said inflow conduit, said outlet port having an outlet port end wall circumscribing a discharge orifice, a lower portion of said outlet port and end wall being disposed within said inner receiving port and spaced inwardly of said receiving port end wall, and an upper portion of said outlet port end wall being disposed within said upper chamber and spaced outwardly of said second end wall, whereby said outlet port is in direct communication with both said upper chamber and said outlet means, and
   i) collection means in said lower chamber for collecting precipitated solids settling in said lower chamber.

14. A vessel according to claim 13, wherein said collecting means comprises a plastic mesh.

15. A vessel according to claim 14, wherein said flow passage of said outlet means g) has an interior wall against which liquid discharged from said vessel flows, at least part of said interior wall having a coating of polytetrafluoroethylene.

* * * * *